United States Patent
Chen et al.

(10) Patent No.: US 10,648,574 B2
(45) Date of Patent: May 12, 2020

(54) TOP ENTRY BALL VALVE

(71) Applicants: Shuguang Chen, Shanghai (CN); Paul John Phelan, Houston, TX (US); Xiaobing Deng, Shanghai (CN)

(72) Inventors: Shuguang Chen, Shanghai (CN); Paul John Phelan, Houston, TX (US); Xiaobing Deng, Shanghai (CN)

( * ) Notice: Subject to any disclaimer, the term of this patent is extended or adjusted under 35 U.S.C. 154(b) by 0 days.

(21) Appl. No.: 15/895,805

(22) Filed: Feb. 13, 2018

(65) Prior Publication Data

US 2018/0347711 A1    Dec. 6, 2018

(51) Int. Cl.
 *F16K 5/06*    (2006.01)

(52) U.S. Cl.
 CPC ......... *F16K 5/0605* (2013.01); *F16K 5/0636* (2013.01); *F16K 5/0689* (2013.01); *Y10T 137/0508* (2015.04); *Y10T 137/6045* (2015.04); *Y10T 137/6109* (2015.04); *Y10T 137/6154* (2015.04)

(58) Field of Classification Search
 CPC .... F16K 5/0605; F16K 5/0636; F16K 5/0626; F16K 5/20; F16K 5/0689; Y10T 137/6041–6045; Y10T 137/6154; Y10T 137/6109; Y10T 137/0508
 USPC .................................................. 251/315.12
 See application file for complete search history.

(56) References Cited

U.S. PATENT DOCUMENTS

| | | | | | |
|---|---|---|---|---|---|
| 3,154,094 | A | * | 10/1964 | Bredtschneider | F16K 5/0636 137/315.19 |
| 3,209,778 | A | * | 10/1965 | Flohr | F16K 5/201 137/327 |
| 3,732,885 | A | * | 5/1973 | Allen | F16K 27/107 137/246.22 |
| 3,771,545 | A | * | 11/1973 | Allen | F16K 5/0673 137/315.21 |
| 3,830,465 | A | * | 8/1974 | Allen | F16K 5/0636 251/360 |
| 4,118,008 | A | * | 10/1978 | Myers | F16K 1/24 251/298 |
| 4,136,709 | A | * | 1/1979 | Rogers | F16K 5/0657 116/208 |
| 4,637,421 | A | * | 1/1987 | Stunkard | F16K 5/0636 137/327 |
| 5,193,573 | A | * | 3/1993 | Chronister | F16K 5/0626 137/315.19 |
| 5,313,976 | A | * | 5/1994 | Beasley | F16K 5/0636 137/15.22 |
| 2012/0217425 | A1 | * | 8/2012 | Beasley | F16K 5/0678 251/174 |

* cited by examiner

*Primary Examiner* — Marina A Tietjen

(57) ABSTRACT

A top entry ball valve including a valve body, a valve cover, a valve stem, an assembly screw, a spring, a support sleeve, a support valve seat, a sphere, and a sealing valve seat. The valve stem passes through the valve cover and the valve body and is fixedly connected to the sphere disposed within the valve body; the valve cover is fixed to the opening of the cavity of the valve body by screws, to seal the cavity of the valve body; the sphere spherically fits with the support valve seat and the sealing valve seat; the support sleeve and the spring are provided between the support valve seat and the valve body; the spring presses the support sleeve and the support valve seat such that the support valve seat clings to the sphere; the support sleeve is fixedly connected to the valve body by the assembly screw.

1 Claim, 5 Drawing Sheets

TOP ENTRY BALL VALVE

TECHNICAL FIELD

The present disclosure relates to a ball valve, and particularly to a top entry ball valve.

BACKGROUND

Existing ball valve generally includes a main valve body, an auxiliary valve body, a valve stem, a ball, a spring, and a valve seat. The valve stem is mechanically combined with the ball. The ball and the valve seat are used as sealing elements. The ball is spherically fitted with the valve seat. The ball is capable of being rotated at 90 degrees in the valve body with the valve stem serving as a rotating shaft, so as to open the channel (pipeline) of the valve body or close it to prevent media from flowing in the channel. The force of the spring keeps the ball in close contact with the valve seat.

The disadvantage of the foregoing ball valve is that, since the main valve body is connected with the auxiliary valve body through flanges, the assembly or disassembly of internal parts can be achieved only after the flanges of the main valve body and the auxiliary valve body were released, which makes the valves on pipeline, especially welded valves under high temperature and high pressure, difficult to be operated.

SUMMARY

The purpose of the present disclosure is to provide a top entry ball valve, to solve the problems raised in the above-mentioned background art.

In order to achieve the above object, the present disclosure provides the following technical schemes.

A top entry ball valve comprises a valve body, a valve cover, a valve stem, an assembly screw, a spring, a support sleeve, a support valve seat, a sphere, and a sealing valve seat. The valve stem passes through the valve cover and the valve body and is fixedly connected to the sphere disposed within the valve body. The valve cover is fixed to the opening of the cavity of the valve body by means of a screw(s), to seal the cavity of the valve body. The sphere spherically fits with the support valve seat and the sealing valve seat. The support sleeve and the spring are provided between the support valve seat and the valve body. The spring presses the support sleeve and the support valve seat such that the support valve seat clings to the sphere. The support sleeve is fixedly connected to the valve body by means of the assembly screw.

As a further aspect of the present disclosure, the support valve seat is provided with a support valve seat-inner spherical surface and a support valve seat-outer spherical surface which have a same spherical center. The support valve seat-outer spherical surface spherically fits with a support sleeve-inner spherical surface of the spherical surface, and the support valve seat-inner spherical surface spherically fits with the sphere.

As a further aspect of the present disclosure, the outer of the support sleeve is provided with a boss and an extension plate in the radial direction. The boss and an assembly groove cooperate of the valve body with each other. The assembly groove is provided at the valve body where corresponds to the lower end of the support sleeve. The extension plate is provided with an assembly hole. The assembly screw is threaded through the assembly hole and fitted to an assembly screw hole at a corresponding position of the valve body by threading.

Compared with the related art, by means of the technical schemes of the present disclosure, during assembly and disassembly, all members within the ball valve can be smoothly operated in the valve upper cavity direction, and therefore, disassembly is simple and convenient.

REFERENCE SIGNS

1. Valve body, 2. Valve cover, 3. Valve stem, 4. Assembly screw, 5. Spring, 6. Support sleeve, 7. Support valve seat, 8. Sphere, 9. Sealing valve seat, 10. Assembly screw hole, 11. Assembly groove, 12. Assembly hole, 13. Boss, 14. Support sleeve-inner spherical surface, 15. Support valve seat-inner spherical surface, 16. Support valve seat-outer spherical surface, 17. Extension plate.

DETAILED DESCRIPTION OF ILLUSTRATED EMBODIMENTS

In the following, the technical solutions in the embodiments of the present disclosure will be clearly and completely described with reference to the figures of the embodiments of the present disclosure. Obviously, the described embodiments are merely some of the embodiments of the present disclosure and not all the embodiments. All other embodiments obtained by those skilled in the art based on the embodiments of the present disclosure without creative work are within the scope of the present disclosure.

Figure 1:
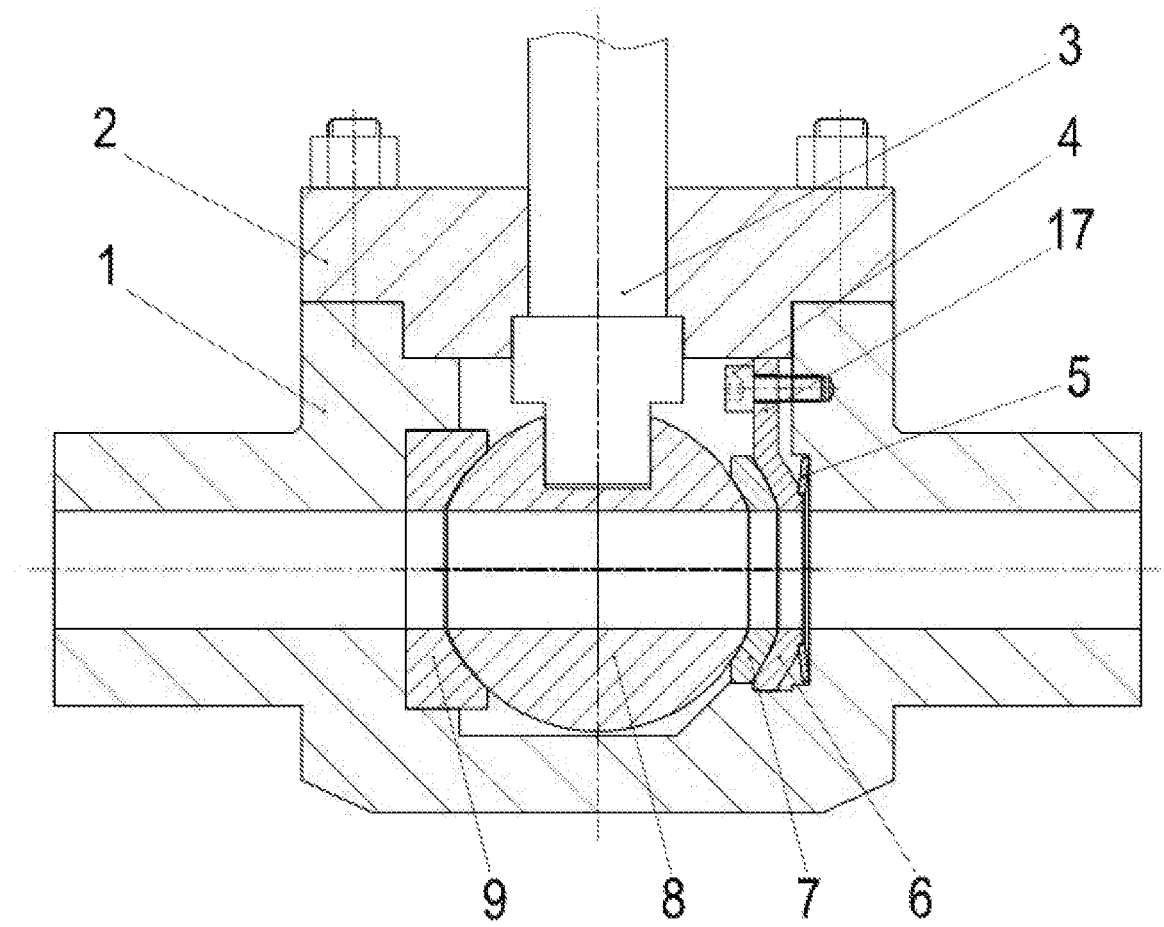
FIG. 1 is a schematic structural diagram illustrating a top entry ball valve.
Figure 2:
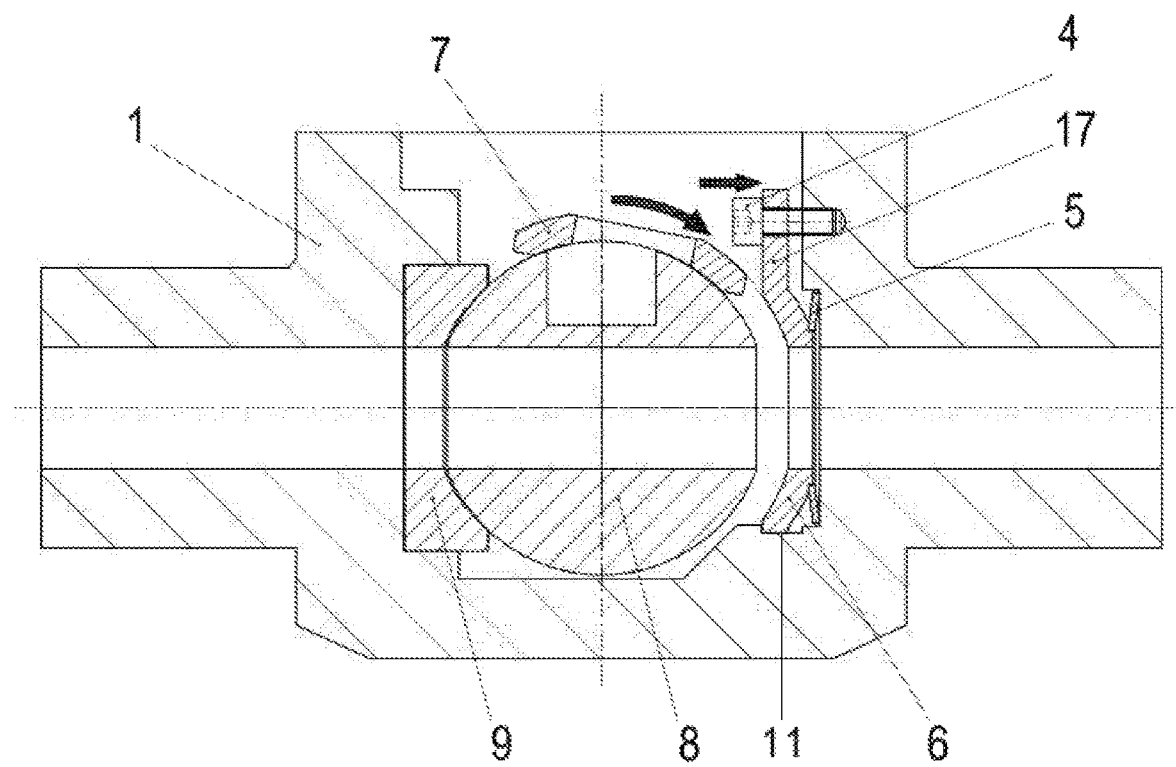
FIG. 2 is an assembly diagram illustrating the top entry ball valve.
Figure 3:
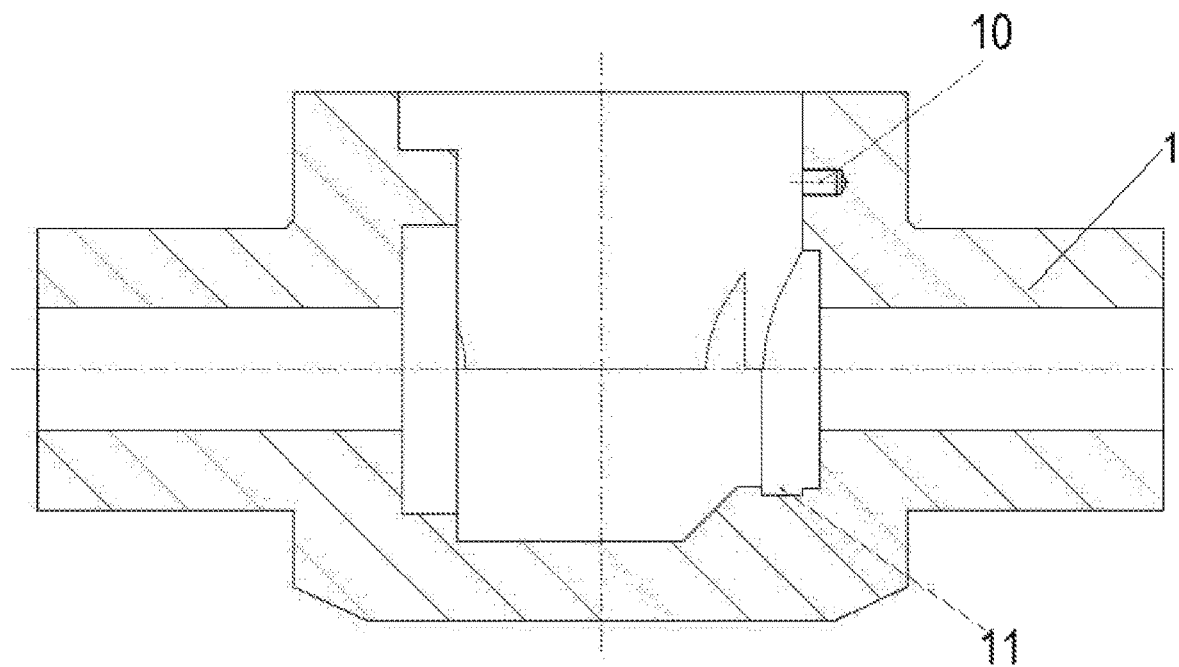
FIG. 3 is a schematic structural diagram illustrating a valve body of the top entry ball valve.
Figure 4:
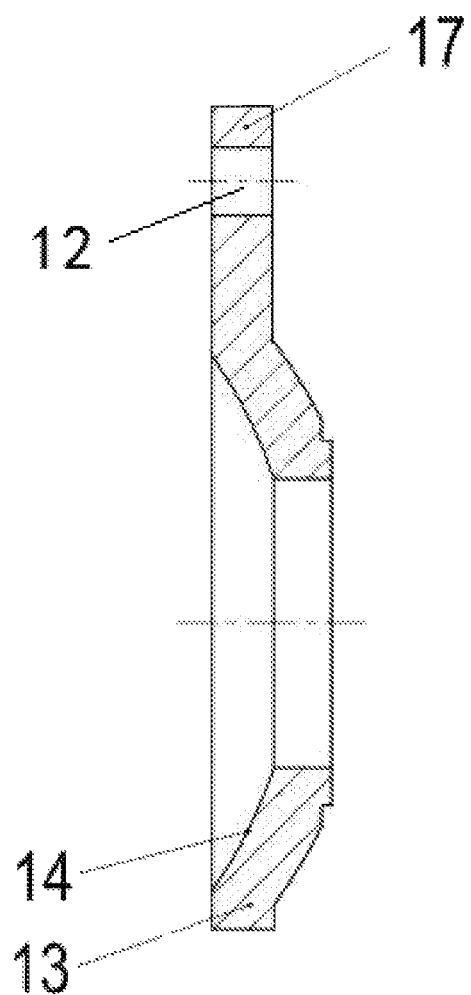
FIG. 4 is a schematic structural diagram illustrating a support sleeve of the top entry ball valve.
Figure 5:
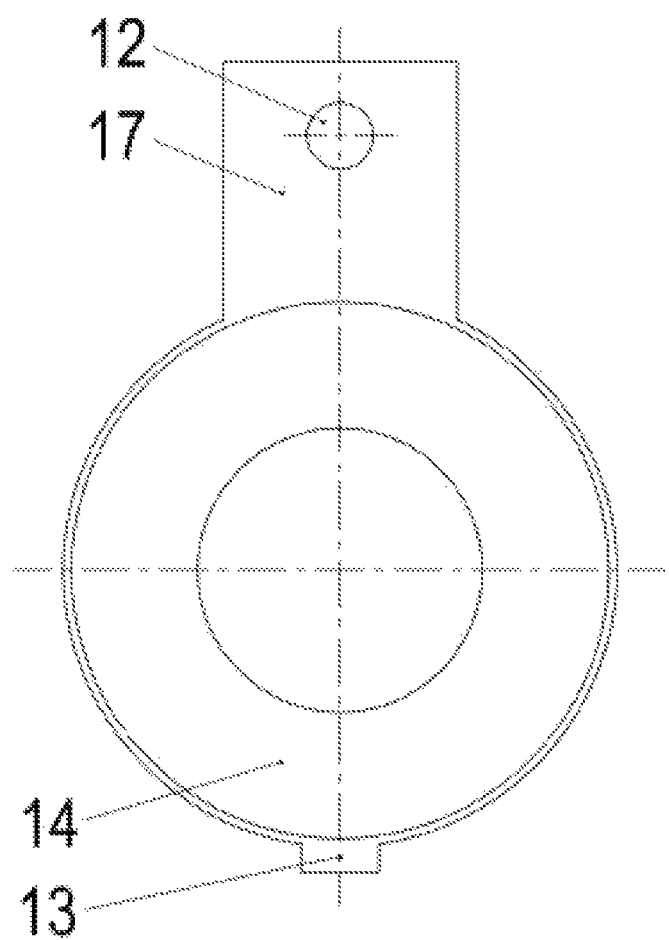
FIG. 5 is a right view illustrating the support sleeve of the top entry ball valve.

Please refer to FIGS. 1 to 5.

An embodiment of the present disclosure relates to a top entry ball valve. The top entry ball valve includes a valve body 1, a valve cover 2, a valve stem 3, an assembly screw 4, a spring 5, a support sleeve 6, a support valve seat 7, a sphere 8, and a sealing valve seat 9.

The valve stem 3 passes through the valve cover 2 and the valve body 1 and is fixedly connected to the sphere 8 disposed within the valve body 1. The valve cover 2 is fixed to the opening of the cavity of the valve body 1 by means of a screw(s), to seal the cavity of the valve body 1. The sphere 8 spherically fits with the support valve seat 7 and the sealing valve seat 9. The support sleeve 6 and the spring 5 are provided between the support valve seat 7 and the valve body 1. The spring 5 presses the support sleeve 6 and the support valve seat 7 such that the support valve seat 7 clings to the sphere 8, so as to ensure good contact and sealing. The support sleeve 6 is fixedly connected to the valve body 2 by means of the assembly screw 4.

The support valve seat 7 is provided with a support valve seat-inner spherical surface 15 and a support valve seat-outer spherical surface 16 which have a same spherical center. The support valve seat-outer spherical surface 16 spherically fits with a support sleeve-inner spherical surface 14 of the support sleeve 6, and the support valve seat-inner spherical surface 15 spherically fits with the sphere 8.

The outer of the support sleeve 6 is provided with a boss 13 and an extension plate 17 in the radial direction. The boss 13 and an assembly groove 11 of the valve body 1 cooperate with each other. The assembly groove 11 is provided at the valve body 1 where corresponds to the lower end (in other words, a lower position) of the support sleeve 6. The extension plate 17 is provided with an assembly hole 12. The assembly screw 4 is threaded through the assembly hole 12 and fitted to an assembly screw hole 10 at a corresponding position of the valve body 1 by threading, thereby achieving fixing of the support sleeve 6.

During assembly, the sealing valve seat 9, the sphere 8, and the spring 5 are fitted into the valve body 1 first and then the valve body 1 is fitted with the support sleeve 6. The boss 13 of the support sleeve 6 is inserted into the assembly groove 11 of the valve body 1. By connecting with the assembly screw 4, the support sleeve 6 is then screwed into the assembly hole 12 on the valve body 1. With the boss 13 serving as a fulcrum of the support sleeve 6, the support sleeve 6 preloads the spring 5 to leave an assembling space for the support valve seat 7 while the assembly screw 4 is screwed down. Next, the support valve seat 7 slides into the space between the sphere 8 and the support sleeve 6 along the sphere surface, and then the assembly screw 4 is unscrewed. Finally, the valve stem 3 and the valve cover 2 are fitted.

During disassembly, the valve cover 2 and the valve stem 3 are removed first. The assembly screw 4 is then screwed down. When the assembly screw 4 is screwed down, the support sleeve 6 preloads the spring 5 with the boss 13 serving as a fulcrum, so as to leave a disassembling space for the support valve seat 7. The support valve seat 7 slides along the sphere surface to be taken out. The sphere 8, the sealing valve seat 9, the support sleeve 6, and the spring 5 are taken out piece by piece finally.

It will be apparent to those skilled in the art that the present disclosure is not limited to the details of the above-described exemplary embodiments, and the present disclosure can be realized in other specific forms without departing from the spirit or essential characteristics thereof. Thus, the embodiments should be considered as exemplary and non-limiting, regardless of the point of view. The scope of the present disclosure is defined by the appended claims rather than the above description. It is intended that all changes that fall within the meaning and range of equivalents of the claims be included in the present disclosure. Any reference signs in the claims should not be construed as limiting the claims.

In addition, it should be understood that although this specification is described in terms of embodiments, not every embodiment includes only one independent technical solution. This manner in which the specification is described is for the sake of clarity only, those skilled in the art should refer to the specification as a whole, and the technical solutions in the embodiments may also be suitably combined to form other embodiments that may be understood by those skilled in the art.

What is claimed is:

1. A top entry ball valve comprising a valve body, a valve cover, a valve stem, an assembly screw, a spring, a support sleeve, a support valve seat, a sphere, and a sealing valve seat, wherein the valve stem passes through the valve cover and the valve body and is fixedly connected to the sphere disposed within the valve body; the valve cover is fixed to an opening of a cavity of the valve body by means of screws, to seal the cavity of the valve body; the sphere spherically fits with the support valve seat and the sealing valve seat; the support sleeve and the spring are provided between the support valve seat and the valve body; the spring presses the support sleeve and the support valve seat such that the support valve seat clings to the sphere; the support sleeve is fixedly connected to the valve body by means of the assembly screw;

wherein the support valve seat is provided with a support valve seat-inner spherical surface and a support valve seat-outer spherical surface which have a same spherical center, wherein the support valve seat-outer spherical surface spherically fits with a support sleeve-inner spherical surface, and the support valve seat-inner spherical surface spherically fits with the sphere; and, wherein the support sleeve is provided with a boss and an extension plate in the radial direction, wherein the boss and an assembly groove cooperate with each other, the assembly groove is provided at the valve body where corresponds to the lower end of the support sleeve; the extension plate is provided with an assembly hole, the assembly screw is threaded through the assembly hole and fitted to an assembly screw hole at a corresponding position on the valve body by threading.

\* \* \* \* \*